United States Patent [19]

Woloszczuk

[11] 4,332,368
[45] Jun. 1, 1982

[54] VALVE

[75] Inventor: Orest Woloszczuk, Warren, Mich.

[73] Assignee: Crown Systems Company, Madison Heights, Mich.

[21] Appl. No.: 935,352

[22] Filed: Aug. 21, 1978

[51] Int. Cl.³ .............................................. F16K 31/02
[52] U.S. Cl. ........................................ 251/30; 251/43; 251/130; 251/138; 251/86; 169/71; 141/18; 137/513.3
[58] Field of Search .................. 251/30, 44, 45, 46, 251/138, 130, 25, 43; 169/11, 61, 30, 71, 74; 141/18, 21; 137/513.3, 513.7

[56] References Cited

U.S. PATENT DOCUMENTS

| 787,422 | 4/1905 | Wolfe | 251/30 |
|---|---|---|---|
| 1,307,207 | 6/1919 | Mitchell | 251/130 |
| 1,592,747 | 7/1926 | Slagle | 137/513.7 |
| 2,214,290 | 9/1940 | Ward | 137/513.7 |
| 2,329,001 | 9/1943 | Robinson | 251/44 |
| 2,480,712 | 8/1949 | Carbon | 251/44 |
| 2,780,296 | 2/1957 | Heigis | 169/11 |
| 2,821,355 | 1/1958 | Hicks, Jr. | 251/30 |
| 2,826,367 | 3/1958 | Cobb | 251/30 |
| 2,969,088 | 1/1961 | Kramer | 251/30 |
| 3,063,467 | 11/1962 | Roberts et al. | 137/516.29 |
| 3,145,056 | 8/1964 | Blahnik | 137/513.7 |
| 3,480,035 | 11/1969 | Szanto | 137/234.5 |
| 3,568,774 | 3/1971 | Mocuk | 169/11 |
| 3,788,400 | 1/1974 | Tuffs | 169/11 |
| 3,860,073 | 1/1975 | Willms | 251/43 |
| 3,934,816 | 1/1976 | Terrell et al. | 251/30 |
| 4,149,565 | 4/1979 | Jennings et al. | 251/44 |

FOREIGN PATENT DOCUMENTS 687839  6/1964  Canada ............................ 137/513.3

Primary Examiner—George L. Walton
Attorney, Agent, or Firm—Whittemore, Hulbert & Belknap

[57] ABSTRACT

Fast-acting valve structure for rapidly evacuating a container of fire retardant material or the like comprising a pilot valve including an annular radially movable, self-centering valve seat, means for actuating the pilot valve either automatically or manually, a poppet valve, structure operably associated with the poppet valve to cause the poppet valve to be biased closed when the poppet valve is in a closed position without mechanical biasing structure, and operable to cause immediate opening of the poppet valve on initial opening of the pilot valve to permit rapid discharge of the container into a discharge manifold through structure for securing the valve structure to the container, and a resiliently mounted and sealed sleeve for guiding the poppet valve between open and closed position.

16 Claims, 6 Drawing Figures

VALVE

BACKGROUND OF THE INVENTION

1. Field of the Invention

The invention relates to valve structures and refers more specifically to a rapid acting valve for release of fire retardant material from a container in the shortest possible time.

2. Description of the Prior Art

Most prior valve structures for release of fire retardant materials have not reacted rapidly enough to prevent damage to property and/or injury to personnel in response to temperature changes due to fire and the like. Where, in the past, valve structures have reacted rapidly, they have either been complicated and expensive to manufacture or have not been automatically actuated or have not included a manual operation alternative or have not been readily rechargeable and reuseable.

Further, valve structures of the past have often not provided adequate sealing for fire retardant material to be evacuated from a container to which the valve structure is secured, whereby pressure leaks have caused failure of the fire retardant to evacuate from the container at the desired time, or has unduly retarded the evacuation of the container.

Also, with valve structures of the past, wherein adequate sealing has been provided, mechanical biasing structures have often been used which retard the rapid operation of the valves and are therefore undesirable. Adequate sealing has additionally required close machining tolerances in the past, increasing the cost of prior valves.

SUMMARY OF THE INVENTION

The valve structure of the invention includes a pilot valve, means for actuating the pilot valve, either automatically by an electric signal or manually by mechanical structure, to open a poppet valve which permits rapid evacuation of a container through structure for securing the valve structure to the container into a discharge manifold.

The poppet valve is guided into movement into and out of sealing engagement with the securing structure by means of an angularly movable, sealed sleeve in which the poppet valve is positioned, which sleeve is positioned in a recess in a valve body member. The poppet valve has a diameter larger than the opening through the container which it seals, whereby with the pilot valve closed, the poppet valve is biased into a closed position by a pressure differential. The pressure differential is maintained by means of an orifice bypassing a check valve positioned in the poppet valve, which check valve permits filling the container with fire retardant material under pressure and provides initial pressure to close the poppet valve prior to the check valve opening.

Both the electrical and mechanical actuating structure for the pilot valve are adjustable to ensure rapid operation of the pilot valve. Structure is also provided in conjunction with the pilot valve to prevent accidental opening of the poppet valve during shipment and the like. The pilot valve is further provided with an annular, radially movable valve seat.

DESCRIPTION OF THE PREFERRED EMBODIMENT

Figure 1:
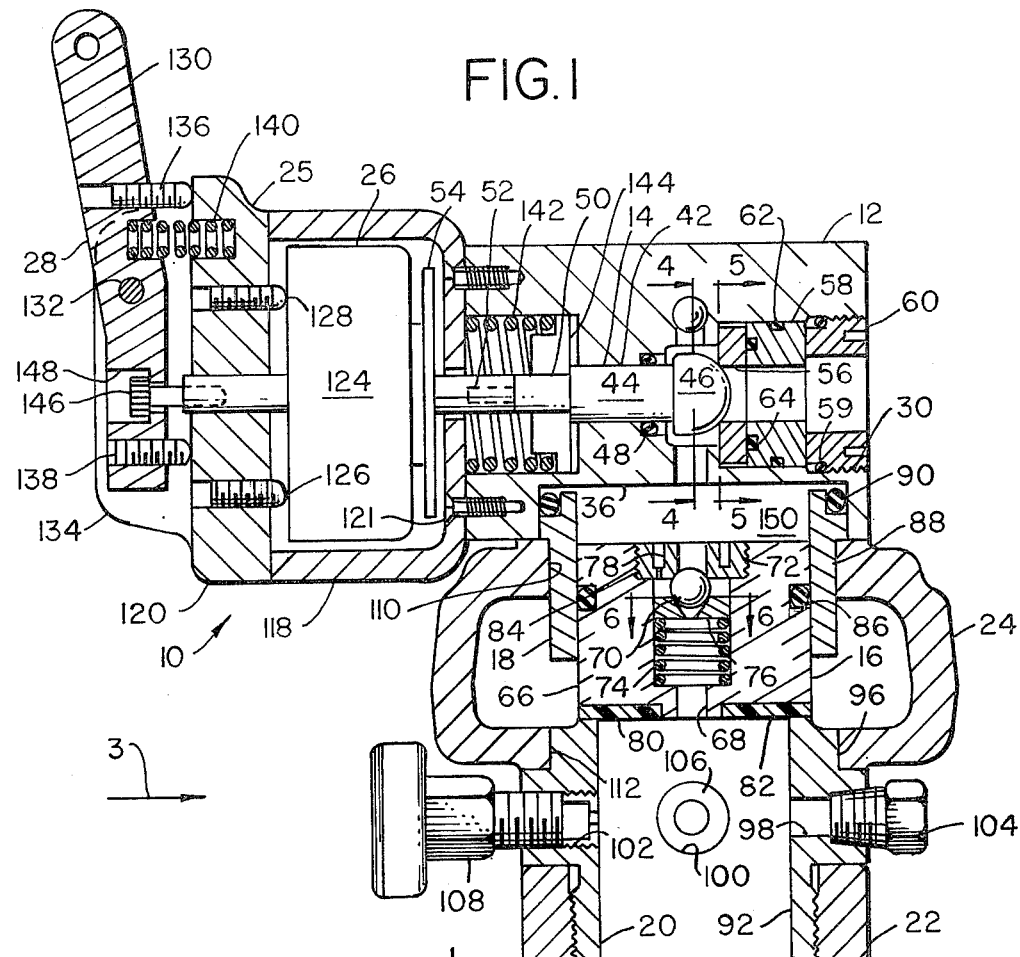
FIG. 1 is a cross section of the valve structure of the invention, taken substantially on the line 1—1, in FIGS. 2 and 3.

The valve structure 10 as best shown in FIG. 1 includes a valve body 12 having a pilot valve structure 14 therein, the poppet valve structure 16, guide structure 18 for the poppet valve structure 16, securing means 20 for securing the valve structure 10 to a container 22 for fire retardant material and a manifold 24 secured together as shown. Both electrical means 26 and mechanical means 28 are provided in actuating mechanism 25 for actuating the valve structure 10.

In more detail, the valve body 12 includes an opening 30 extending therethrough having the different diameter portions shown best in FIG. 1. A second opening 32, best shown in FIG. 4, also extends through the valve body member 12 from the charging connector 34 across the opening 30 to the cylindrical recess 36 in the valve body member 12.

Figure 4:
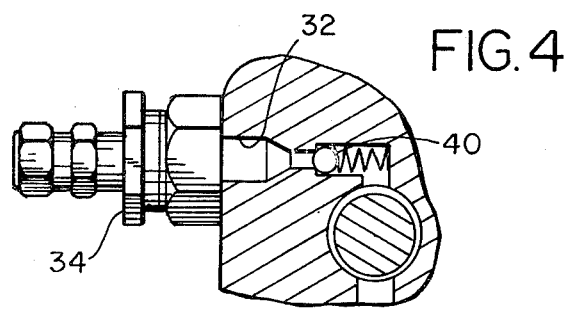
FIG. 4 is a partial cross section of a portion of the valve structure illustrated in FIG. 1, taken substantially on the line 4—4, in FIG. 1.
Figure 5:
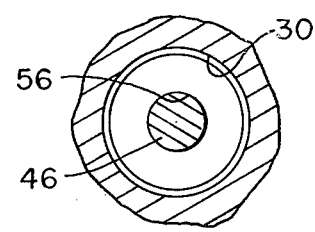
FIG. 5 is a partial cross section of the valve structure illustrated in FIG. 1, taken substantially on the line 5—5, in FIG. 1.

The charging connector 34 shown best in FIG. 4 may be any coupling for a pressure line through which fire retardant material such as Halon and supercharging material such as Nitrogen may be passed under pressure into the container 22 through the valve structure 10. As shown, the charging connector 34 is threadedly engaged with the outer end of the opening 32. The spring biased check valve structure 40 which permits passing the fire retardant material under pressure into the container 22 through the valve structure 10, but prevents leakage of fluid in the container 22 out through the passage 32 is positioned as shown in FIG. 4 in passage 32.

The pilot valve structure 14 positioned within the multi-diameter passage 30 in the valve body member 12 includes the valve member 42 having the cylindrical stem portion 44 and the spherical valve portion 46. The stem portion 44 of the valve member 42 is sealed in passage 30 by the O-ring seal 48. The valve stem portion 44 includes a small diameter portion 50 terminating in a threaded portion 52 which is threadedly engaged with the armature 54 of the actuating structure 25. The spherical portion 46 of the pilot valve member 42 is engaged with the inner periphery of an annular valve seat 56. Valve seat 56 is secured in opening 30, for slight radial movement therein whereby the valve seat 56 is self-centering on the spherical valve portion 46 of valve member 42, by the sealing ring 58 in opening 30 and the locking ring 60 which is threaded into the opening 30.

O-ring seals 62 and 64 are provided between the sealing ring 58 and the body member 12 and between the sealing ring 58 and the radially movable annular valve seat 56. A seal 59 is also provided between the locking ring 60 and body member 12, as shown.

Figure 6:
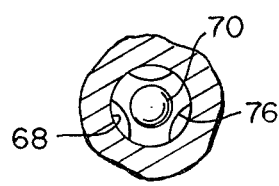
FIG. 6 is a partial cross section of the valve structure illustrated in FIG. 1, taken substantially on the line 6—6, in FIG. 1.

The poppet valve structure 16 includes the valve member 66 having the variable diameter opening 68 extending therethrough. A ball check valve 70 is held between the valve seat 72 threaded into one end of the opening 68 by the bias spring 74 acting against the valve cage 76, best shown in FIG. 6. The annular valve seat 72 further includes a bleed opening 72 for bleeding pressure through the valve member 66 past the check valve 70.

The poppet valve 66, when in the closed position shown, provides a seal on the surface 80 of the securing structure 20 by means of the annular rubber sealing member 82 set therein as shown best in FIG. 1. An O-ring seal 84 is provided in the annular exterior groove 86 of the valve member 66 and seals between the valve member 66 and the guide structure 18.

Guide structure 18 includes the guide sleeve 88 having a variable diameter exterior surface as shown in FIG. 1 and the O-ring seal 90 positioned between the guide sleeve 88 and the valve body member 12 within the recess 36 in the valve body member 12, again as shown best in FIG. 1.

The securing structure 20 is a sleeve having an opening 92 extending therethrough. Sleeve 92 has a threaded end 94 to which the container 22 is secured. Sleeve 92 further has a reduced diameter portion 96 for receiving the manifold structure 24, again as shown best in FIG. 1. Openings 98, 100 and 102 extend radially through the securing structure 20 in which a bleed valve 104, a pressure relief valve 106 having a rupture disc therein, which may rupture at 1600 pounds per square inch for example, and a pressure gauge 108 are secured.

Figure 2:
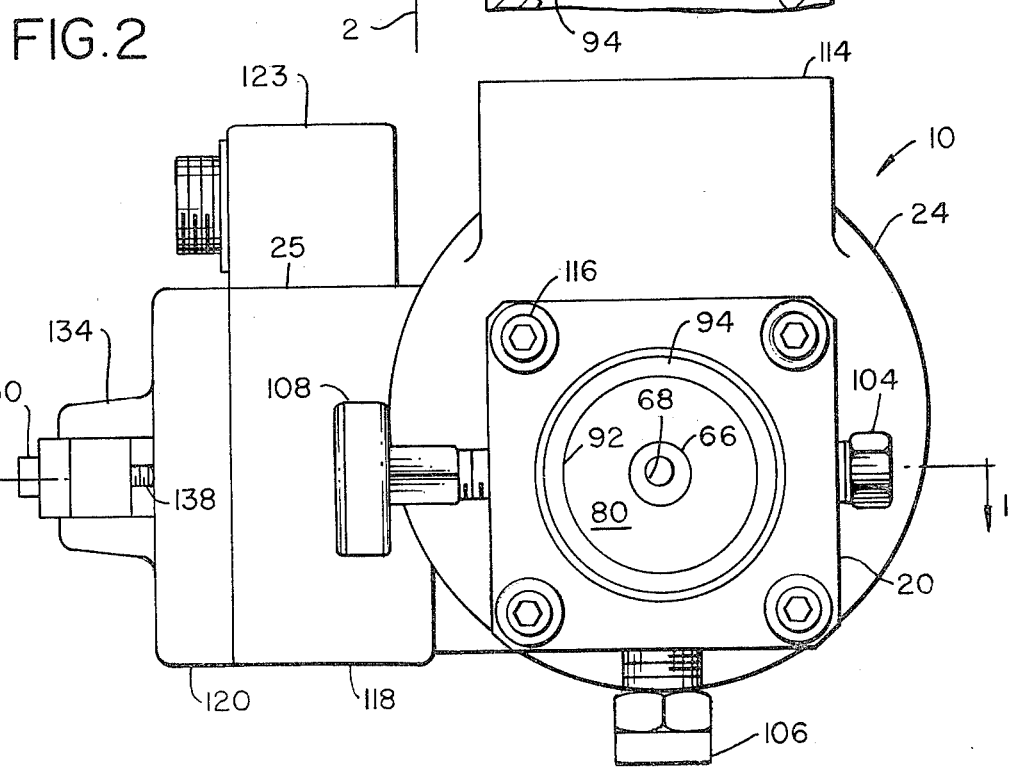
FIG. 2 is a bottom view of the valve structure illustrated in FIG. 1, taken in the direction of arrow 2, in FIG. 1.

Manifold structure 24 as shown best in FIGS. 1 and 2 includes the openings 110 and 112 extending therethrough for receiving the guide structure 18 and the securing structure 20, respectively. The manifold structure 24 further includes a discharge opening 114 best shown in FIGS. 2 and 3.

The securing structure 20, manifold structure 24, poppet valve structure 16 and guide structure 18 are held in assembly with the valve body member 12 by the assembly bolts 116.

The actuating mechanism 25 includes the armature 54 threadedly engaged with the poppet valve structure 14 secured in the solenoid case 118. The solenoid case 118 is provided with a cover 120. The solenoid case 118 and cover 120 are held in position on the valve body 12 and solenoid case 118 respectively by means of the bolts 121 and 122 as shown in FIGS. 1 and 3.

Figure 3:
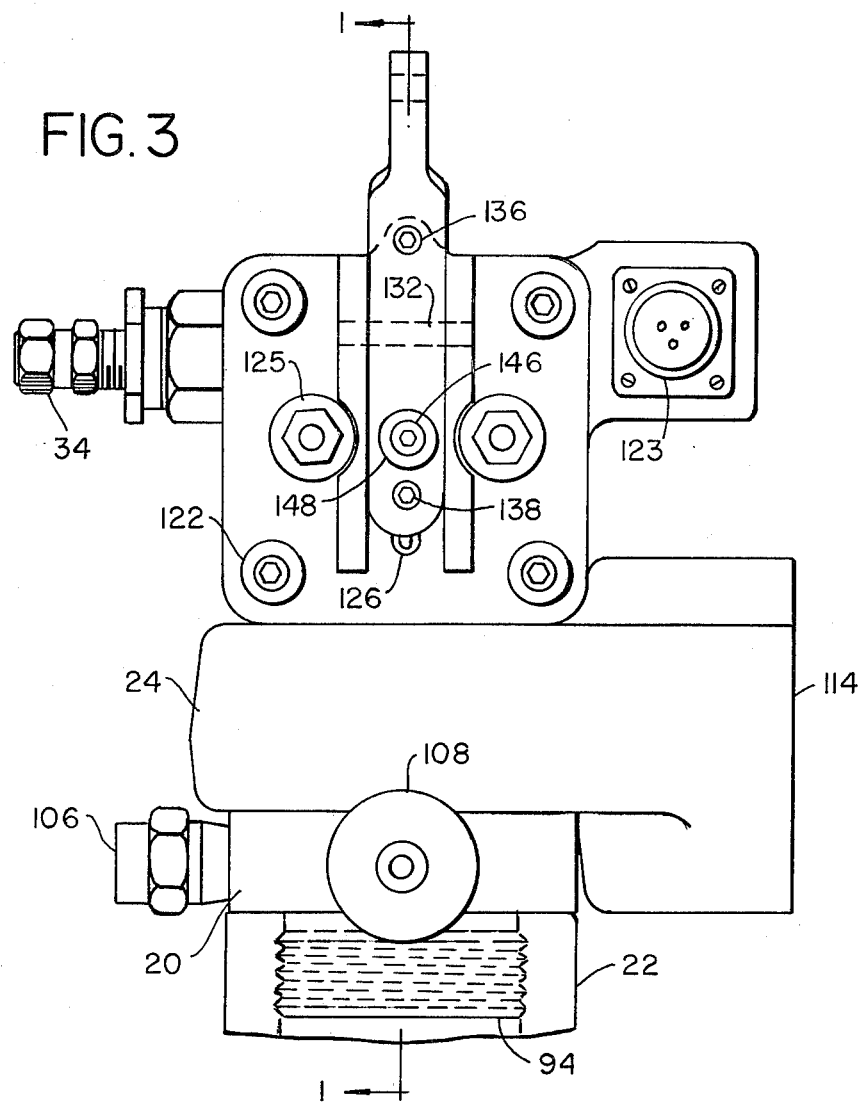
FIG. 3 is an elevation view of the valve structure illustrated in FIG. 1, taken in the direction of arrow 3, in FIG. 1.

The structure 26 for electrically actuating the valve structure 10 of the actuating mechanism 25 includes the electrical connector 123, shown best in FIG. 3, and the solenoid 124 in the solenoid housing 118, which may be automatically energized by a remote sensing circuit for heat or the like producing an output electrical signal applied to valve 10 through the electrical connector 123, and which is provided with the adjusting screws 126 and 128 in the cover 120 whereby the distance of the solenoid 124 from the armature 54 may be closely regulated. Solenoid 124 is supported in housing 118 by bolts 125, again shown best in FIG. 3.

The mechanical means 28 for actuating the pilot valve structure 14 of the actuating mechanism 25 includes the lever 130 mounted on the pivot pin 132 between the mounting ears 134 on the cover 120. Screws 136 and 138 extend through the lever 130 and abut the cover 120 for limiting the pivotal movement of the lever 130 in both directions about the pivot pin 132. A bias spring 140 is provided, acting between the lever 130 and the cover 120 to resiliently bias the lever 130 as shown in FIG. 1 in a counterclockwise direction.

In overall operation of the valve structure 10, the valve structure 10 is first screwed onto a container 22 for storing fire retardant material such as Halon under pressure. The container 22 is filled with the fire retardant material and may be supercharged to a desired pressure by Nitrogen, for example, through the connector 34, passage 32 and check valves 40 and 70. During supercharging of the valve structure 10 with Nitrogen at, for example 750 P.S.I., after it has been charged with Halon, the Halon is displaced from the area around the pilot valve structure 14 and over the poppet valve structure 16 and in particular in the chamber 150. Since the Nitrogen is lighter than Halon, the opening time of the poppet valve member 66 is thus reduced. The container 22 having the valve structure 10 thereon is then positioned with the discharge opening 114 of manifold structure 24 directed to discharge the fire retardant material into the desired area.

On receipt of a predetermined electrical signal in the solenoid 124, the solenoid will move the armature 54 to open pilot valve structure 14, that is, to the left as shown in FIG. 1. The valve member 42 of the pilot valve structure 14 is thus moved to the left as shown in FIG. 1 against the bias provided by the bias spring 142 and bias ring 144.

Alternatively, armature 54 may be moved to the left by mechanically actuating the lever 130 with the screw 136 moved to the left sufficiently to permit pivoting of the lever 130 in a clockwise direction as shown in FIG. 1.

The screws 126 and 128 determine the position of the solenoid 124 relative to the armature 54 and place the solenoid 124 sufficiently close to the armature 54 to produce extremely rapid actuation of the armature 54 over the required distance to open the pilot valve structure 14. Similarly, the screw 138, when properly adjusted, positions the bolt 146 which is set in the recess 148 in the lever 130 and is threadedly engaged with the armature 54 exactly in engagement with the lever 130 so that any movement of the lever 130 is immediately transferred to the armature 54.

The screw 136 is provided to lock the lever 130 in a predetermined position so that the lever 130 will not accidentally be pivoted to open the pilot valve structure 14 during storage, shipment and the like.

On opening of the pilot valve structure 14, the pressure in chamber 150 is substantially immediately reduced to atmospheric pressure from the pressure of the fire retardant material in the container 22 at which the pressure is maintained in the chamber 150 while the pilot valve structure 14 is closed by the pressure bleed opening 78 in the valve seat member 72 of the poppet valve structure 16.

Prior to opening of the pilot valve structure 14, the pressure in the chamber 150 has produced a differential pressure on the poppet valve member 66 due to the small diameter of the opening 92 in securing means 20 compared to the larger diameter of the valve member 66 in the chamber 150, causing the poppet valve member 66 to firmly seat on the surface 80 of the securing means 20, whereby the container 22 is prevented from discharging into the manifold 24.

The positive seating of the poppet valve member 66 is facilitated by placing the valve member 66 within the guide sleeve 88. The guide sleeve 88 permits slight angular adjustment about the axis of generation thereof of the sleeve 88 and valve member 66 so that exact alignment of the surface 80 of the securing means 20 and the valve member 66 in production is not required. Slight misalignments in manufacture may be compensated for by angular adjustments of the guide sleeve 88 due to loose fit of sleeve 88 in recess 36 which sleeve is sealed and biased centrally by O-ring seal 90.

A leakage of less than 1% per year from the container 22 is thus accomplished by poppet valve structure 16 which is not spring biased and in which alignment in manufacturing is not critical, as compared to other valves requiring the same leakage characteristics.

On opening of the pilot valve structure 14 and exhausting the pressure in the chamber 150 through the opening 30, the poppet valve structure 16 is caused to move up in FIG. 1 to immediately begin discharging the fire retardant material from the container 22 through the securing structure 20 into the manifold 24.

The upward movement of the poppet valve structure 16 will continue even though the pilot valve structure 14 is subsequently closed prior to complete opening of the poppet valve structure 16, since the pressure is not returned to the chamber 150 except through the small bleed opening 78.

Due to the large area of the valve member 66, the contents of the container 22 are thus rapidly discharged through the securing structure 20 and the manifold 24 into the desired area.

The action of the valve structure 10 is particularly rapid. Thus, for example, initial actuation of the valve structure 10 is accomplished in less than five milliseconds and the complete discharge of a container of five pounds of Halon under 750 pounds per square inch gauge pressure is accomplished in less than 100 milliseconds.

After the electrical or mechanical actuation force is removed from the valve structure 10, the pilot valve structure 14 is closed by the bias spring 142 acting against the bias ring 144 and the container 22 may again be charged through the passage 32 and connector 34 for subsequent use, as above.

In recharging the valve structure 10, a force of approximately 100 pounds per square inch is applied in chamber 150 by the fire retardant material prior to opening of ball check valve 70 to reseat the poppet valve member 66 and thus close the valve structure 10.

In closing the valve structure 10, the valve seat 56 is caused to move radially in passage 30 to axially align with the sperical portion 46 of valve member 42. The seal between the valve seat 56 and sealing ring 58 is maintained by O-ring 64 bearing on the face of the valve seat opposite the valve member 42.

In the valve structure 10, it will be particularly noted that there is minimum trapped gas above the poppet valve structure 16 to discharge through the pilot valve structure. There is no spring bias on the poppet valve to exert a force which must be overcome before the poppet valve is opened. There is a minimum of external sealing members required and once discharge of the container through the valve structure 10 is initiated, it is continuous. That is to say, discharge is not cut off by reseating of the pilot valve.

While one embodiment of the invention has been disclosed, other embodiments and modifications thereof are contemplated. It is the intention to include all embodiments and modifications as are defined by the appended claims within the scope of the invention.

What I claim as my invention is:

1. Valve structure comprising a valve body, a pilot valve within the valve body, a poppet valve having an axis along which it operates positioned exterior of and operably associated with the valve body and pilot valve for actuation along its axis in response to actuation of the pilot valve and having check valve means positioned axially therein through which a container to which the valve structure is secured is filled with a material in a direction from the pilot valve and through the poppet valve for sealing the poppet valve, means forming a pressure chamber between the poppet valve and pilot valve in conjunction with the valve body to receive said material for sealing the poppet valve, separate means for securing the valve structure to a container to be evacuated on actuation of the poppet valve including a valve seat for receiving the poppet valve to seal the container, a poppet valve guide sleeve mounted between the poppet valve and valve body for slight pivotal movement about one end relative to the valve body receiving the poppet valve and guiding its movement between the separate means for securing the valve structure to the container and the valve body to ensure proper seating of the poppet valve on the valve seat, a separate manifold surrounding the poppet valve receiving the sleeve in one end thereof at the valve body and receiving the securing means in the other end thereof through which material from the container is discharged on opening of the poppet valve by opening the pilot valve and expelling the material in said pressure chamber though said pilot valve, means securing the separate valve body, guide sleeve, poppet valve, securing means and manifold together and means for actuating the pilot valve operably associated with the pilot valve.

2. Valve structure comprising a valve body, pilot valve within the balve body, a poppet valve having axially opposite ends operably associated with the valve body and pilot valve for actuation in response to actuation of the pilot valve and having check valve means positioned axially therein through which a container to which the valve structure is secured is filled with a material in a direction from the pilot valve and through the poppet valve for sealing the poppet valve, said poppet valve being cylindrical and including an opening extending axially therethrough having three separate internal diameters, said check valve means including a valve seat member positioned in the largest diameter portion of the axial opening through the poppet valve, a check valve in the central portion of the axial opening through the poppet valve, spring biasing means urging the check valve into a closed position against the valve seat member, means forming a pressure chamber between the poppet valve and pilot valve in conjunction with the valve body to receive said material for sealing the poppet valve, and a bleed orifice through the valve seat member opening into the pressure chamber and bypassing the check valve means for equalizing pressure on opposite sides of the poppet valve with the pilot valve closed without slowing operation of the poppet valve when the pilot valve is opened, means for securing the valve structure to a container to be evacuated on actuation of the poppet valve including a valve seat for receiving the poppet valve to seal the container, a slightly pivotal poppet valve guide sleeve positioned between the poppet valve and valve body for receiving the poppet valve and guiding its movement between the means for securing the valve structure to the container and the valve body to ensure proper seating of the poppet valve on the poppet valve seat, a manifold surrounding the poppet valve receiving the sleeve in one end thereof at the valve body and receiving the securing means in the other end thereof through which material from the container is discharged on opening of the poppet valve by opening the pilot valve and expelling the material in said pressure chamber through said pilot valve, means securing the valve body, guide sleeve, poppet valve, securing means and manifold together and means for actuating the pilot valve operably associated with the pilot valve.

3. Structure as set forth in claim 2, wherein the spring biased check valve requires a pressure of approximately one hundred pounds per square inch before it will open whereby approximately one hundred pounds per square inch is applied to the poppet valve to close the poppet valve prior to opening the check valve without the necessity of springs or other mechanical means for closing the poppet valve.

4. Valve structure comprising a valve body, a pilot valve within the valve body, a poppet valve operably associated with the valve body and pilot valve for actuation in response to actuation of the pilot valve and having check valve means positioned axially there through which a container to which the valve structure is secured is filled with a material in a direction from the pilot valve and through the poppet valve for sealing the poppet valve, means forming a pressure chamber between the poppet valve and pilot valve in conjunction with the valve body to receive said material for sealing the poppet valve, a bleed orifice bypassing the check valve means opening into the pressure chamber for equalizing pressure on opposite sides of the poppet valve with the pilot valve closed without slowing operation of the poppet valve when the pilot valve is opened, means for securing the valve structure to a container to be evacuated on actuation of the poppet valve including a valve seat for receiving the poppet valve to seal the container, a poppet valve guide sleeve mounted between the poppet valve and valve body for slight pivotal movement about one end relative to the valve body receiving the poppet valve and guiding its movement between the means for securing the valve structure to the container and the valve body to ensure proper seating of the poppet valve on the poppet valve seat, a manifold surrounding the poppet valve receiving the sleeve in one end thereof at the valve body and receiving the securing means in the other end thereof through which material from the container is discharged on opening of the poppet valve by opening the pilot valve and expelling the material in said pressure chamber through said pilot valve, means securing the valve body, guide sleeve, poppet valve securing means and manifold together and means for actuating the pilot valve operably associated with the pilot valve.

5. Valve structure comprising a valve body, a pilot valve operably associated with the valve body, a poppet valve operably associated with the valve body and pilot valve for actuation in response to actuation of the pilot valve, check valve means positioned within the poppet valve through which a container to which the valve structure is secured is filled with a material in a direction from the pilot valve and through the poppet valve for sealing the poppet valve, means forming a pressure chamber between the poppet valve and pilot valve in conjunction with the valve body to receive said material for sealing the poppet valve, the means forming the pressure chamber includes a guide sleeve for the poppet valve one end of which is positioned within the valve body for slight pivotal movement with respect thereto and which guide sleeve receives the poppet valve in the other end thereof said poppet valve including a valve seat for receiving said poppet valve to seal the container, said pilot valve is actuated to open and discharge the material in said pressure chamber through said pilot valve to open said poppet valve and discharge the material from the container and a bleed orifice bypassing the check valve means opening into the pressure chamber for equalizing pressure on opposite sides of the poppet valve with the pilot valve closed without slowing operation of the poppet valve when the pilot valve is opened.

6. Structure as set forth in claim 5, and further including separate means for securing the valve structure to a container to be evacuated having said valve seat thereon for receiving the poppet valve.

7. Structure as set forth in claim 6 and further including a separate manifold surrounding the means for receiving the valve structure to a container to be evacuated at one end thereof and surrounding the guide sleeve at the other end thereof.

8. Structure as set forth in claim 5 wherein the pilot valve includes a spherical valve portion, a radially movable annular valve seat and an annular seal positioned between the valve body and the annular valve seat on the side of the valve seat opposite the valve portion of the pilot valve.

9. Valve structure comprising a valve body, a pilot balve body, a pilot valve within the valve body, a poppet valve having an axis along which it operates positioned exterior of an operably associated with the valve body and pilot valve for actuation along its axis in response to actuation of the pilot valve and having check valve means positioned axially therein through which a container to which the valve structure is secured is filled with a material in a direction from the pilot valve and through the poppet valve for sealing the poppet valve, means forming a pressure chamber between the poppet valve and the pilot valve in conjunction with the valve body to receive said material for sealing the poppet valve separate means for securing the valve structure to a container to be evacuated on actuation of the poppet valve including a valve seat for receiving the poppet valve to seal the container, a poppet valve guide sleeve positioned between the poppet valve and valve body for receiving the poppet valve and guiding its movement between the separate means for securing the valve structure to the container and the valve body to ensure proper seating of the poppet valve on the valve seat, a separate manifold surrounding the poppet valve receiving the sleeve in one end thereof at the valve body and receiving the securing means in the other end thereof through which material from the container is discharged on opening of the poppet valve by opening the pilot valve and expelling the material in said pressure chamber through said pilot valve, means securing the separate valve body, guide sleeve, poppet valve securing means and manifold together and means for actuating the pilot valve operably associated with the pilot valve, wherein the guide sleeve has a single internal diameter and three separate external diameters with the smallest external diameter portion at one end thereof adjacent the largest external diameter portion thereof forming an annular groove therewith, and the valve body is provided with a cylindrical recess therein receiving the one end of the guide sleeve, and further including an O-ring sealing member positioned in the annular groove formed between the smallest diameter and largest diameter portions of the guide sleeve at the one end thereof for resiliently sealing between the one end of the guide sleeve and the cylindrical recess to permit slight angular movement of the guide sleeve about the axis of generation of the guide sleeve.

10. Structure as set forth in claim 9, and further including an annular sealing surface on one end of the poppet valve adapted to engage the valve seat on the securing means for sealing between the securing means and manifold when the poppet valve is in a closed position, said securing means having an internal diameter about the valve seat thereon less than the external diameter of the poppet valve whereby a pressure differential exists across the poppet valve tending to hold the poppet valve closed as long as the pilot valve remains closed.

11. Structure as set forth in claim 9, wherein the pilot valve includes a spherical valve portion, a radially movable annular valve seat and an annular seal positioned between the valve body and the annular valve seat on the side of the valve seat opposite the valve portion of the pilot valve.

12. Structure as set forth in claim 9, wherein the means to actuate the pilot valve includes an armature connected to the pilot valve and mechanically biased to close the pilot valve and means for actuating the pilot valve through the armature both electrically and mechanically.

13. Structure as set forth in claim 12, wherein the means for actuating the pilot valve electrically is a solenoid positioned adjacent the armature and further including set screws for accurately positioning the solenoid with respect to the armature.

14. Structure as set forth in claim 12, wherein the means for mechanically actuating the pilot valve comprises a pivotally mounted lever operably associated with the armature structure for moving the armature structure on pivoting of the lever and means for limiting the pivotal movement of the lever.

15. Structure as set forth in claim 9, wherein the valve structure is constructed and arranged to be readily rechargeable and reuseable.

16. Structure as set forth in claim 9, wherein the valve structure is constructed and arranged to replace Halon in the area of the pilot valve with Nitrogen during supercharging of the valve structure whereby opening time of the valve structure is reduced.

* * * * *